United States Patent
Bullock

(10) Patent No.: US 7,647,685 B2
(45) Date of Patent: Jan. 19, 2010

(54) METHOD OF MAKING SLIP RESISTANT FILE FOLDERS

(75) Inventor: Roddy McKee Bullock, Milford, OH (US)

(73) Assignee: Smead Manufacturing Company, Hastings, MN (US)

( * ) Notice: Subject to any disclaimer, the term of this patent is extended or adjusted under 35 U.S.C. 154(b) by 8 days.

(21) Appl. No.: 12/014,343

(22) Filed: Jan. 15, 2008

(65) Prior Publication Data

US 2008/0110010 A1  May 15, 2008

Related U.S. Application Data

(62) Division of application No. 10/755,518, filed on Jan. 12, 2004, now abandoned.

(51) Int. Cl.
*B21D 35/00* (2006.01)

(52) U.S. Cl. .................................... 29/469.5

(58) Field of Classification Search ............... 29/505, 29/469.5, 460; 281/29; 229/67.1
See application file for complete search history.

(56) References Cited

U.S. PATENT DOCUMENTS

| | | |
|---|---|---|
| 1,585,237 A | 5/1926 | Doughty |
| 2,052,623 A | 9/1936 | Harby |
| 2,062,436 A | 12/1936 | Yawman |
| 2,291,724 A | 8/1942 | Jonas |
| 3,283,992 A | 11/1966 | Hanson et al. |
| 3,524,583 A | 8/1970 | Gregory |
| 3,863,828 A | 2/1975 | King |
| 3,885,726 A | 5/1975 | Fridlund et al. |
| 4,053,057 A | 10/1977 | Snowden |
| 4,503,110 A | 3/1985 | Skene |
| 4,600,329 A | 7/1986 | Ferreira-Godinho |
| 4,863,093 A | 9/1989 | DuCorday |
| 4,867,057 A | 9/1989 | Bradley et al. |
| 5,201,548 A | 4/1993 | Lang et al. |
| 5,275,439 A | 1/1994 | Hawes, Jr. et al. |
| 5,720,427 A | 2/1998 | Kachel et al. |
| 5,769,311 A | 6/1998 | Morita et al. |
| 6,063,226 A | 5/2000 | Foster et al. |
| 6,273,470 B1 | 8/2001 | Bullock |
| 6,938,549 B2 | 9/2005 | Bullock |

*Primary Examiner*—John C Hong
(74) *Attorney, Agent, or Firm*—Altera Law Group, LLC

(57) ABSTRACT

A folder made from a roll of folder material stock. The folder has a front flap having a first top edge and a first width, and a rear flap connected to said front flap by a folder bottom, the rear flap having a second top edge and a second width. A slip-resistant portion is disposed on at least one of the flaps near said first or second top edge. The folder material stock comprises paper and a polymer material. A method of making the folder includes the steps of providing folder material stock comprising polymeric material, providing embossing dies in spaced, operable, mating relationship, positioning the folder material stock appropriately in the embossing dies, applying force to at least one of the embossing dies so as to decrease the spaced relationship, and deforming the folder material stock.

10 Claims, No Drawings

METHOD OF MAKING SLIP RESISTANT FILE FOLDERS

This application is a divisional of application Ser. No. 10/755,518, now abandoned filed 12 Jan. 2004. The application is incorporated herein by reference.

FIELD OF THE INVENTION

This invention relates to improvements in slip resistant file folders, expandable folders, hanging folders, and the like.

BACKGROUND OF THE INVENTION

File folders have become a necessity in today's modern offices and businesses. Such folders may be as simple as stiff, folded paperboard, often having predetermined cut out or raised areas for attaching labels or other identifying indicia. File folders, such as manila folders, are useful for storing paper and related articles in an orderly manner in file drawers or cabinets. Many improvements have been made to the simple file folder, including expandable folders that can hold a large amount of papers, reinforced edges for stronger, longer lasting use, and clasp means for positively securing the file contents so that enclosed papers stay organized and do not fall out.

Many variations of the simple file folder are known. For example "file pockets" are expandable file folders having fan-folded sides for higher capacity storing of papers. File pockets come in a variety of sizes, including letter and legal size. "Expanding files" are similar to file pockets, but generally have a flap attached that can be secured to a front cover to prevent papers from falling out the top of the file. Expanding files often have numerous pockets inside which are sometimes indexed for added organizational capability. Closely related to expanding files are expanding wallets, which generally have an elastic cord attached to the flap which can be used to secure the flap in a closed position.

In addition to simple file folders, file pockets, expanding files and expanding wallets, it is known to use hanging folders for receiving file folders and the like. Hanging folders are made for use in standard storage units such as file cabinets, desk drawers and the like. Hanging folders are generally formed of a sheet of heavy weight paper with a central horizontal fold which forms the folder's bottom and has open sides. Folds are provided in the file's top edges through which hanging rods are movably or immovably fixed. The ends of these rods are exposed and notched, enabling the file to hang on a complementary standard parallel file frame in office storage equipment, such as filing cabinets and desk drawers.

Improvements to hanging folders include providing the inner surfaces of the folded over portions at the top of each flap with uniformly spaced slots for insertion of labeling tabs. Reinforcing plastic film may be applied to the exposed edges to reduce wear as the file is moved in the frame or file drawer. This film may be applied with colored adhesive to provide a color coding system or a clear film may be applied over a colored surface by clear adhesive to achieve the same result. Hanging folders with strong, flat bottoms have been made to handle oversized or heavy contents. Other various improvements to hanging folders are exemplified in the art, including various means for attaching labeling, as well as adapting the hanging folder concept for a wide variety of articles, such as hanging loose-leaf ring binders.

One significant improvement to existing file folders and hanging folders is the slip resistant file folder disclosed in U.S. Pat. No. 6,273,470, issued to Bullock on Aug. 14, 2001.

As disclosed, such a slip resistant folder can be made with embossed portions that aid in gripping the top edge of such folders without slipping. Such a slip resistant portion is especially useful for heavy or thick folders, in which it is difficult to grip the top of the folder to remove it from the file drawer without it slipping. This is because the paper stock used for existing folders is generally very smooth, and somewhat slick, requiring the person removing the file to exert extremely high pressures to lift the folder. Even pulling a relatively thin file folder or hanging folder out of a full drawer is made more difficult by the pressure of adjacent files. Often it is necessary to use two hands to grip a folder for removal. This problem is especially pronounced for older persons, persons having arthritis, or persons otherwise being incapable of applying sufficient grip strength.

However, it has been found that the level of embossing on paper, i.e., the depth of embossments, can be limited due to the paper folder stock tearing upon embossment. In general, a deep embossment produces a better slip resistant portion, but deep embossments generally result in at least some tearing of the folder paper stock. While functionally such a folder having some paper tearing is still slip resistant, aesthetically it is desirable that the tearing be minimized or eliminated.

Accordingly, it would be desirable to have a method for making slip-resistant file folders, hanging folders, and the like, that eliminates or minimizes paper tearing during manufacture.

SUMMARY OF THE INVENTION

A folder made from a roll of folder material stock is disclosed. The folder comprises a front flap having a first top edge and a first width, and a rear flap connected to said front flap by a folder bottom, the rear flap having a second top edge and a second width. A slip-resistant portion is disposed on at least one of the flaps near said first or second top edge. The folder material stock comprises paper and a polymer material.

A method of making the folder comprises the steps of providing folder material stock comprising polymeric material, providing embossing dies in spaced, operable, mating relationship, positioning the folder material stock appropriately in the embossing dies, applying force to at least one of the embossing dies so as to decrease the spaced relationship, and deforming the folder material stock.

DETAILED DESCRIPTION OF THE INVENTION

Folders of the present invention are made from a roll of folder material stock and have a first tope edge and a first width, a rear flap connected to the front flap by a folder bottom, the rear flap having a second top edge and a second width, and a slip resistant portion disposed on at least one of the flaps near the first or second top edges. The "top" edges refer to the edges normally disposed at the top of a folder when in use, and opposite the bottom, such as the medial fold of a manila or hanging folder.

As used herein, when used alone, the term "folder" encompasses all of "file folders," "file pockets," "expanding files," "expanding wallets," and "hanging folders."

As used herein, the term "file folder" means folders such as manila, kraft, or pressboard, typically supplied in letter or legal size. File folders come in a variety of "points", which denote the weight of the paper stock used for the folder. File folders are supplied with various improvements, such as color coding, undercut tabs for labeling, reinforcing strips along edges, and fasteners to hold papers attached in various positions. By way of example, a manila file folder suitable for the improvement of the present invention is the Smead 152 L heavyweight 11 pt. manila folder, available from the Smead company, Hastings, Minn.

As used herein, the term "file pockets" means expandable pockets having fan-folded sides and a fan-folded bottom, useful for large files. File pockets have a larger capacity than file folders, and may be used in standard filing systems, including hanging files. By way of example, a file pockets suitable for the improvement of the present invention is the Wilson Jones 64 series 3½ inch expansion COLORLIFE® file pocket, from the Wilson Jones Company, or the Smead 1524E Redrope® Pockets. File pockets are often reinforced to provide maximum durability and capacity.

As used herein, the term "expanding files" means expandable filing folders, generally having a fan-folded bottom, full fan-folded sides, and a fold-over flap that is used to securely close the file. By way of example, an expanding file suitable for the improvement of the present invention is the 21-pocket Smead DR117A expanding file with flap, available from the Smead company.

As used herein, the term "expanding wallets" means expandable filing folders similar to expanding files. Expanding wallets generally have elastic cord tie flaps for securely closing a top flap. By way of example, expanding wallets suitable for the improvement of the present invention include the Oxford Plus® 60343 3½ inch expansion reinforced wallets.

As used herein, the term "hanging folder" means folders designed for use with hanging file systems. Such folders come in many variations including box-bottom, expandable, color-coded, and reinforced-edge, durable designs. By way of example, hanging folders suitable for the improvement of the present invention include standard size folders such as the Esselte Pendaflex® 4152 series (letter size) and 4153 series (legal size) folders; box bottom folders such as the Esselte Pendaflex® 4152x series (letter size) and 4153x series (legal size) folders; expanding file pockets such as the Smead 18H24ESS (letter size) and 18H26ESS (legal size) folders; and hanging expanding files such as the Globe-Weis Global-File® 85030 expanding hanging file. A further example of hanging folders of the type useful for the improvement of the present invention is disclosed in U.S. Pat. No. 5,275,439 to Hawes, Jr. et al., issued Jan. 4, 1994, which is hereby incorporated herein by reference.

As used herein the term "emboss" or "embossing" refers to male/female die forming of the folder paper stock to impart a raised pattern. The dies can be heated. When the imparted pattern is indented, it is called "debossing." Embossing includes what is commonly referred to as "blind" embossing.

As used herein, the term "foil embossing" refers to embossing in which a color, texture, or other surface modification is added in the form a metallic or pigment foil. Foil can be added by use of a combination die that allows the embossed area to be foil stamped and raised almost simultaneously. Foil can also be added in a separate step by registering the foil and foil stamping on an embossed image.

As used herein, the terms "slip resistant" or "slip resistant portions" refers to a portion of a file folder, such as a hanging folder, in which the folder material stock has been embossed sufficiently to provide raised bumps or ridges which aid in gripping the folder, for example, for lifting from a file drawer. Slip resistant portions can be enhanced by application of tacky materials such as adhesive, or by application of other components such as textured foils and the like.

The improvement of the method and folder of the present invention can be practiced with any type of folder, including manila folders, file pockets, expanding files are expanding wallets, hanging folders, as well as other folding articles that may be stored in a file drawer or cabinet, such as hanging ring binders, bound presentation folders, and the like. However, the invention will be disclosed below in the context of a preferred embodiment of a hanging file folder.

The improvement of the method and folder of the present invention lies primarily in the embossing tooling and the paper stock utilized, at least for the slip resistant portion. In general slip resistant portions can be imparted by methods described in the above-mentioned Bullock patent, which is hereby incorporated by reference herein. Likewise, in general, the method and folder of the present invention can be as is known in the art for making hanging file folders, such as hanging folders disclosed in U.S. Pat. No. 2,291,724, and file folders having pockets as shown in U.S. Pat. No. 6,063,226, issued to Foster et al., on May 16, 2000, both of which are hereby incorporated by reference herein. In general, hanging file folders of the present invention can utilize known equipment, such as the Model HFF-WF Kempsmith Web Fed Hanging File Folder Machine provided by Kempsmith, Milwaukee, Wis.

Hanging file folders can be produced from a web of folder material stock supplied as roll stock. For example, as disclosed in the above-mentioned Foster et al. patent, the folder material stock can be 11 point, 124 pound (about 200 grams per square meter (gsm)) basis weight paper available from International Paper, La. The folder material stock can be generally processed by the addition of features such as pockets, and punched slots, and can be severed by a cutting assembly into separate pieces prior to the addition of hanging rods and final folding. The folder material stock of the present invention can be provided in any of the known basis weights for existing folders, including the 11 point, 124 pound (about 200 gsm) basis weight above. In general, basis weights in the range of about 150 gsm to 300 gsm can be utilized, the primary limitation being economic since heavier papers are more expensive due to their higher material content.

The improvement of the present invention lies in providing for improved folder material stock, such as paper stock, i.e., more highly embossable paper stock, and/or improved embossing either before or after the cutting step in which the roll stock is severed into individual file folders. The improved folder material stock of the present invention comprises polymeric material, such as polymer coated paper, or laminated paper comprising a polymer film, or a paper having integrally associated therewith polymer fibers.

In one embodiment, the folder material stock is paper stock coated with a PVC polymer coating, such as that produced by Manu Paper Coat of New Delhi, India Such paper is a soft and easily workable cover material suitable for hand and machine binding which can be adaptable for file folders. The paper has a hard wearing wipeable surface and is scratch resistant and ideally suited to fine quality foil blocking, which, as described below, is another feature of one embodiment of the present invention. One type of paper sold by Manu Paper Coat is MANTEX® which is a strong paper and cotton based PVC coated material.

In another embodiment, the folder material stock of the present invention can be paperboard/plastic film laminates in which a plastic film offers tear resistance and/or long term durability. The folder stock can be a laminate comprising, for example, paper/film, paper/film/paper, or film/paper/film. Such papers can be obtained from MeadWestvaco's Packaging Resources Group (PRG), Stamford, Conn., and sold under one of the names CRESCENDO®, FORTE®, KRAFTPAK®, AND PRINTKOTE®. Such papers can have smooth consistent surfaces and can be embossed/debossed, foil stamped, and well as printed, including with holographic images.

The folder material stock can also be laminated paper sold by Allkotes, Sydney, Australia, such as PLASTA-KOTE®, COVER-KOTE®, KEY-KOTE®, WINDOW-KOTE®, MATTE-KOTE®, REFLECTA-KOTE®, ESTER-KOTE®, or FOIL-KOTE®.

The folder material stock can be paperboard from Iggesund Paperboard AB, Sweden. For example, Ingesund's Albato and Creato paperboard lines can be used. Iggesund's Invercote G paperboard provides for improved foil laminating, embossing and hot foil applications. The folder material stock can also be laminated or coated paper stock from Polymer Packaging Incorporated, North Canton, Ohio.

In another embodiment, polymer fibers can be integrated into the wet furnish in the paper making step, such that the paper stock has integrated therein polymer fibers. It is believed that such a paper can have the look and feel of paperboard, but have enhanced extensibility such that embossing does not produce tears or fractures.

In a preferred embodiment, the folder material stock, or at least the slip resistant portion thereof, has the polymer coating or film lamination on the exterior surface, i.e., the surface contacted by the user's fingers when the folder is used and gripped near the top edge. Thus, upon deep embossing, the polymer component can stretch, plastically yielding without rupture to provide for a smooth, un-ruptured outer surface. Even if the underlying paper component ruptures or tears, the tear is contained by the polymer component such that the tear does not propagate and folder durability is preserved.

In one embodiment, the polymer material is a discrete band or patch placed where the slip resistant portion is to be disposed. That is, the polymer material need not extend all the way to the edges, such as the top edge of the folder. In this manner, the amount of polymer applied to the folder material stock can be minimized for cost efficient production of folders such as hanging folders. When the polymer material is placed as a band or patch, the folder stock material is still embossed, along with the polymer material. Therefore, a minimal amount of polymer material is necessary, it need only be sufficient to minimize or eliminate tearing of the paper stock upon embossment.

Therefore, in one embodiment, the present invention is a method of forming a slip resistant file folder comprising the steps of providing a folder material stock, the folder material stock having a polymer material component, such as a polymer coating or laminated film; and embossing the folder material stock. The folder material stock can be a polymer coated paper, a film/paper laminate, or a paper/film/paper laminate, or some other combination of polymer and paper such that the embossments can be made relatively deeper without tearing than could be achieved with paper alone. Otherwise, the method can include any of known steps in the manufacture of folders, including hanging folders. For example, after the embossing step the folder material can be slotted, folded, and/or have hanging rods glued in place thereto.

In one method of making a hanging folder of the present invention, the folder material stock can be provided as a web of material on a roll as roll stock, and processed generally as is commonly done in known methods of making file folders. The only difference is that in the present invention the folder material stock comprises a polymeric material, such as a polymer coating or a laminated film, and a portion of the folder material stock having polymer material is embossed to form a slip resistant portion. Therefore, the web of folder material stock can be fed from the roll to embossing dies, such as a rotary die and embossed. If desired, a pocket material can be adhered to the folder material prior to of after embossing. After embossing, the web can be cut into discrete folder blanks that can then be processed into hanging folders. The discrete folder blanks have opposing terminal edges that correspond to the first and second top edges of the finished folder. Slots can be punched, cut, or otherwise formed near the terminal edges. Metal hanging rods can be placed near the terminal edges, and, if desired, glued in place. The terminal edges can be folded and glued such that the metal rods reside in a channel formed by the fold. The folder blank can then be folded along a central, medial line to form the finished hanging folder.

The folder material stock can be embossed with a rotary embosser, such as a segmented rotary embosser. Rotary embossing paperboard material involves passing a web through one or more sets of rotating cylinders to impart an embossment to the paperboard. Rotary embossers, such as those manufactured by Bernal, Rochester Hills, Mich. can be provided based on modular designs that provide for quick change of emboss patterns. In a segmented rotary embosser, the embossing die can be separate from the rotating cylinder, such that the embossing die can be separately and precisely placed and adjusted, and only the embossing die need be changed for design changes. Thus, the advantage of segmented rotary embossers is that the dies can be changed out relatively quickly and easily to change emboss patterns or to replace worn dies. A modular rotary emboss unit operation can be relatively easily incorporated into an existing file folder manufacturing line, either before or after the web cutting step that produces the individual folder blanks.

In another improvement of slip resistant file folders, such folders can be provided with foil embossed slip resistant portions. Foil embossing by means known in the art can add functionally and aesthetically to slip resistant portions. Functionally, textured materials can be foil embossed to add to the slip resistant nature of slip resistant portions. Aesthetically, various colored materials can be foil embossed to give color and other visually-attractive benefits to the slip resistant portions. For example, foil embossing, or even foil stamping (which does not require embossing), can add a bright, non-tarnishable metallic effect to the slip resistant portion. Foils used in foil embossing can include a wide range of colors, finishes and effects including marble, snake skin, leather, pearl, and woodgrains. Additionally, foils can either be matte or glossy.

In general, foil embossing is achieved by interposing a foil layer over the portion of the folder to be embossed, such that when the embossing dies apply pressure the foil is transferred to the raised embossed portions. The process can use heat, and, if necessary, adhesive. Foil stamping can be added While the above description contains many specificities, these should not be construed as limitations on the scope of the invention, but rather as illustrative of exemplary and preferred embodiments thereof. Many other variations are possible without departing from the scope of the invention as disclosed. Accordingly, it is intended to cover in the appended claims all such variations, changes, and modifications that are within the scope of this invention.

What is claimed is:

1. A method of making a slip-resistant folder to have a designated slip resistant region, said folder having a front flap having a first top edge, a rear flap connected to said front flap by a folder bottom, said rear flap having a second top edge, and a slip-resistant portion disposed on at least one of said flaps near said first or second top edge, said method comprising the steps of:

(a) providing folder material stock comprising stretchable polymeric material in the region to be embossed;

(b) providing embossing dies in spaced, operable, mating relationship;

(c) positioning said folder material stock appropriately in said embossing dies only in the designated slip resistant region;

(d) applying force to at least one of said embossing dies so as to decrease the spaced relationship; and (e) deforming said folder material stock in the designated slip resistant region thereby stretching the stock and polymeric materials simultaneously without rupturing of either material.

2. The method of claim 1, wherein said embossing dies comprise a rotary embosser.

3. The method of claim 2, wherein said rotary embosser is a segmented rotary embosser.

4. The method of claim 1, wherein said folder material stock comprises polymer coated paper.

5. The method of claim 1, wherein said folder material stock comprises polymer fibers.

6. A method of making a slip-resistant portion on a hanging folder, said hanging folder having a front flap having a first top edge, a rear flap connected to said front flap by a folder bottom, said rear flap having a second top edge, and a slip-resistant portion disposed on at least one of said flaps near said first or second top edge, said method comprising the steps of:

(a) providing a web of folder material stock on a roll, said folder material stock comprising polymeric material;

(b) providing embossing dies in spaced, operable, mating relationship;

(c) providing rod members;

(d) providing a cutting blade;

(e) feeding said web of folder material stock from said roll into said embossing dies;

(f) applying force to at least one of said embossing dies so as to decrease the spaced relationship;

(g) deforming said folder material stock in a predetermined region to increase slip resistance in that region;

(h) cutting through said web of folder material stock with said cutting blade to form a discrete folder blank having opposing terminal edges;

(i) placing one of said rod member along each of said opposing terminal edges;

(j) folding said terminal edges to form channels for said rod members; and (k) folding said discrete folder blank along a medial line to form a hanging folder.

7. The method of claim 6, further comprising the step of making slots near each of said opposing terminal edges.

8. The method of claim 6, wherein said folder material stock comprises polymer coated paper.

9. The method of claim 6, wherein said folder material stock comprises a laminate of paper and a foil film.

10. A method of making a slip-resistant folder, said folder having a front flap having a first top edge, a rear flap connected to said front flap by a folder bottom, said rear flap having a second top edge, and a slip-resistant portion disposed on at least one of said flaps near said first or second top edge, said method comprising the steps of:

(a) providing a paper folder material stock (b) integrating polymer fibers into the paper material stock in a predefined band across the stock, said band defining a gripping area (c) providing embossing dies in spaced, operable, mating relationship;

(d) positioning said folder material stock appropriately in said embossing dies;

(e) applying force to at least one of said embossing dies so as to decrease the spaced relationship; and (f) deforming said folder material stock in the gripping area thereby stretching the stock and integrated polymeric materials simultaneously without rupturing of either material.

* * * * *